Nov. 10, 1942.  K. KOEHL  2,301,415
PROJECTION APPARATUS
Filed Oct. 12, 1938  4 Sheets-Sheet 1
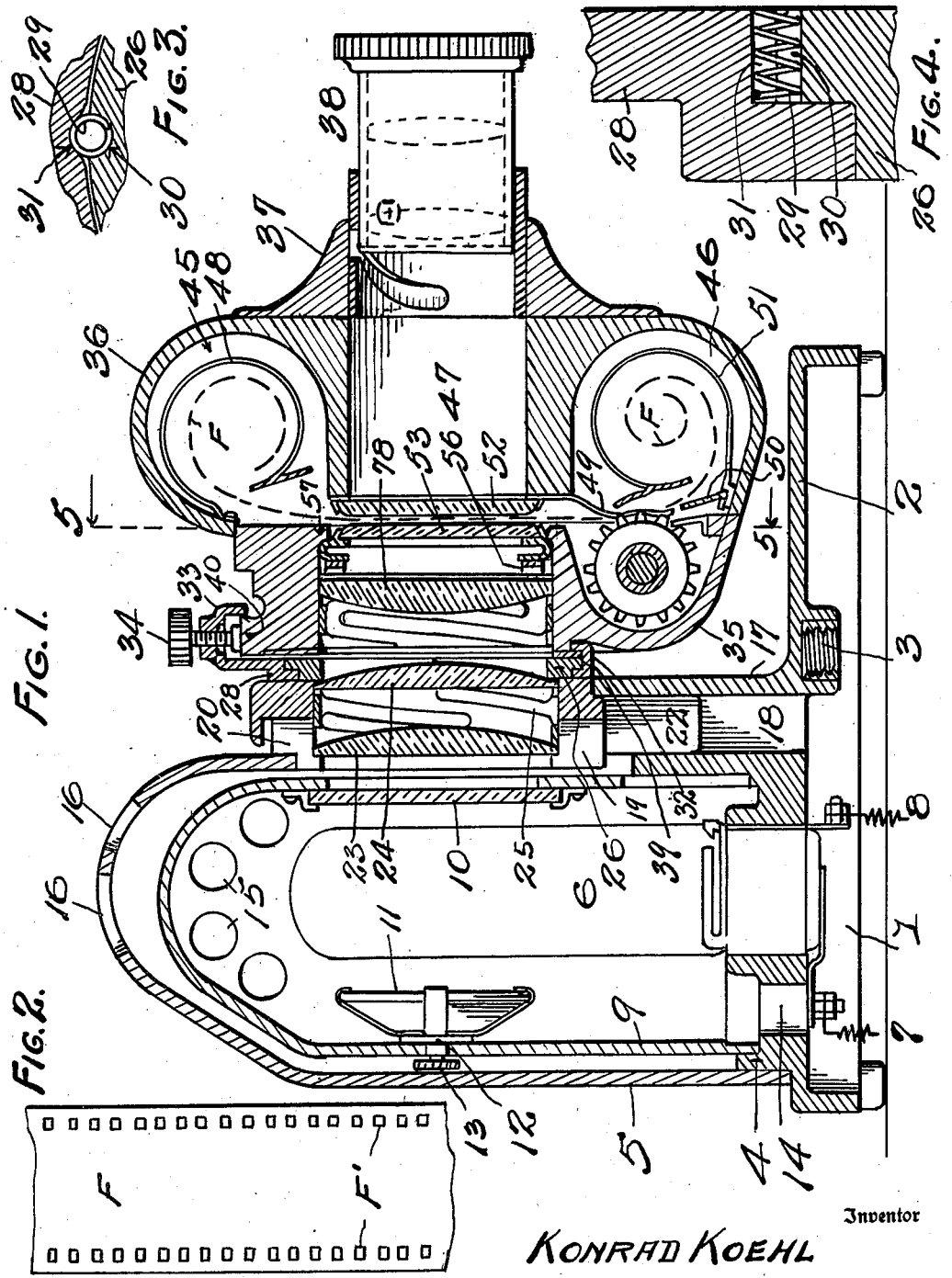
Inventor
KONRAD KOEHL
By Chas. K. Davies + Son
Attorney

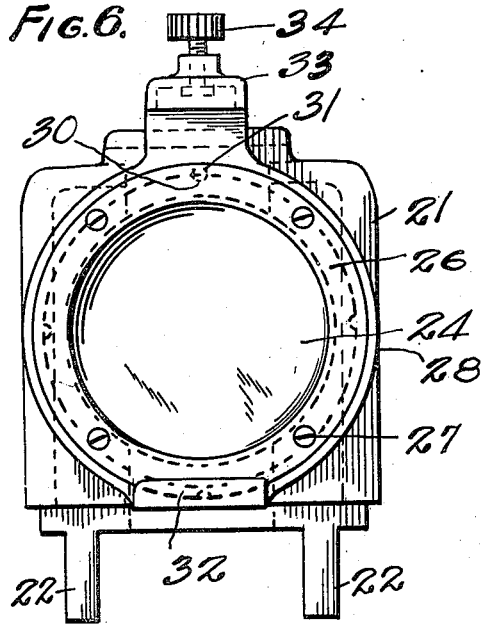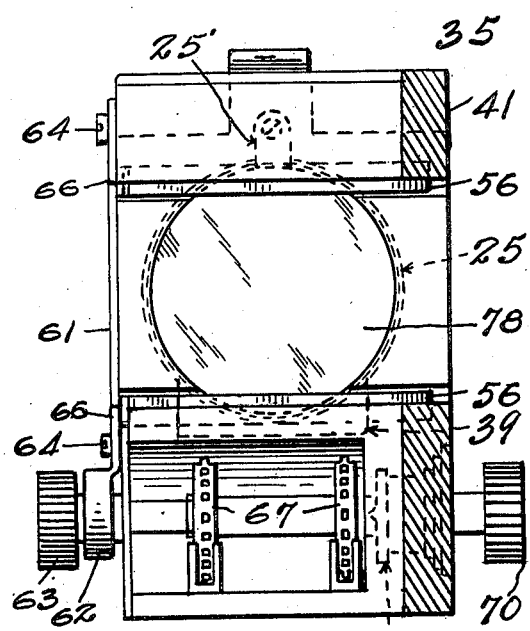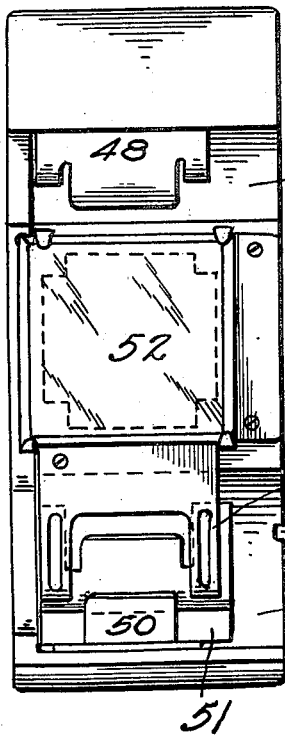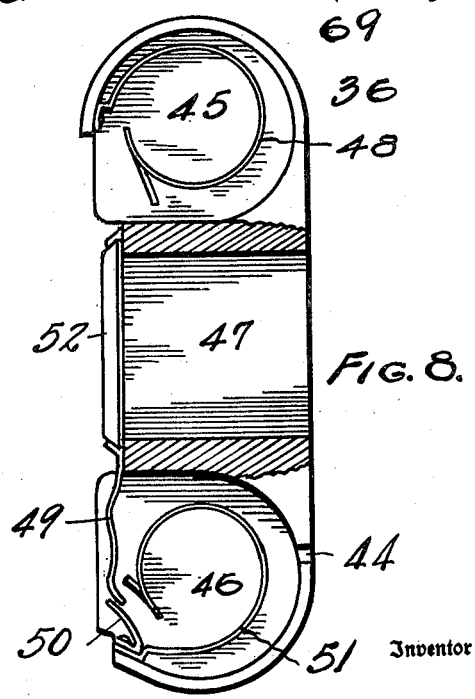

Nov. 10, 1942.          K. KOEHL                2,301,415
              PROJECTION APPARATUS
            Filed Oct. 12, 1938      4 Sheets-Sheet 3
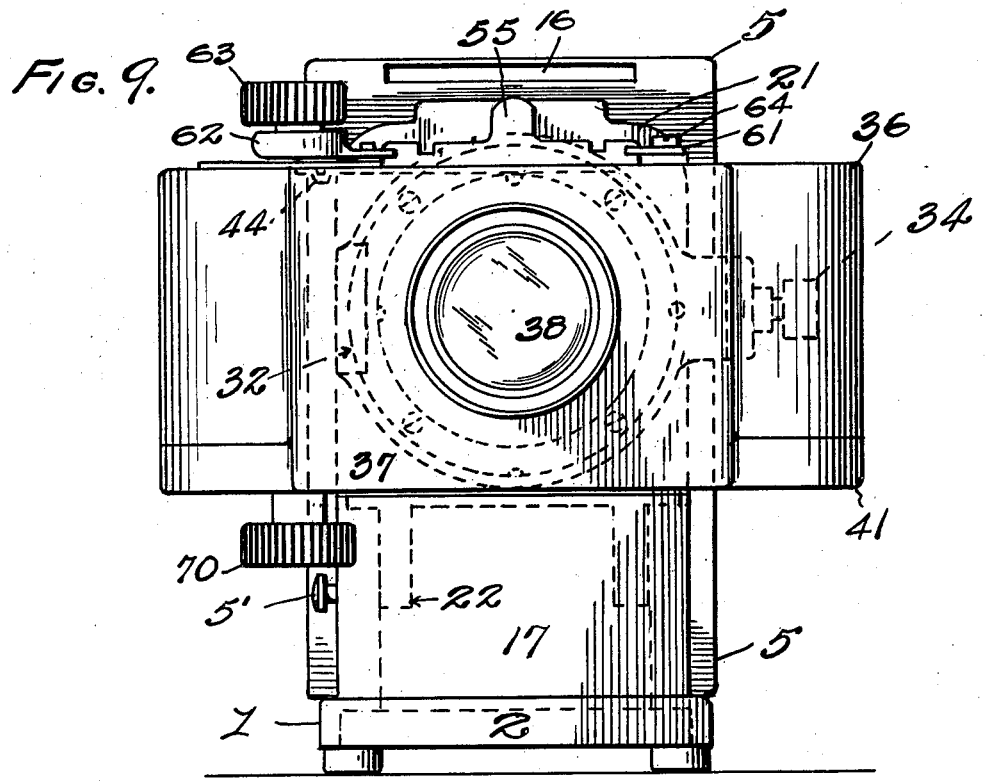
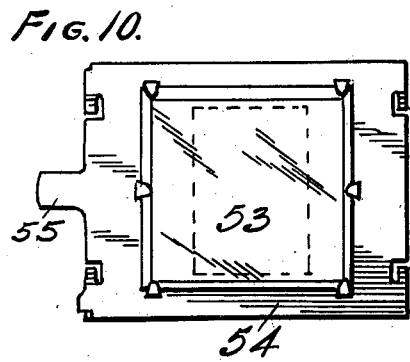
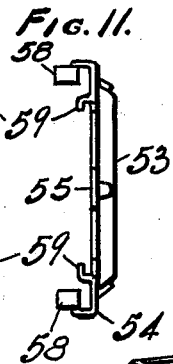
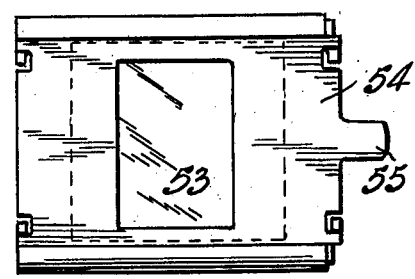
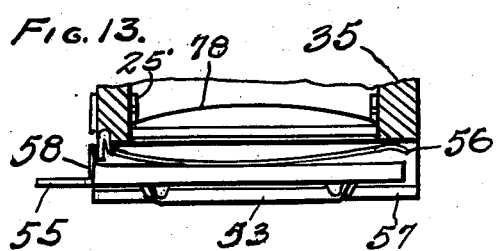
Inventor
KONRAD KOEHL
By Chas K. Davies + Son
    Attorney

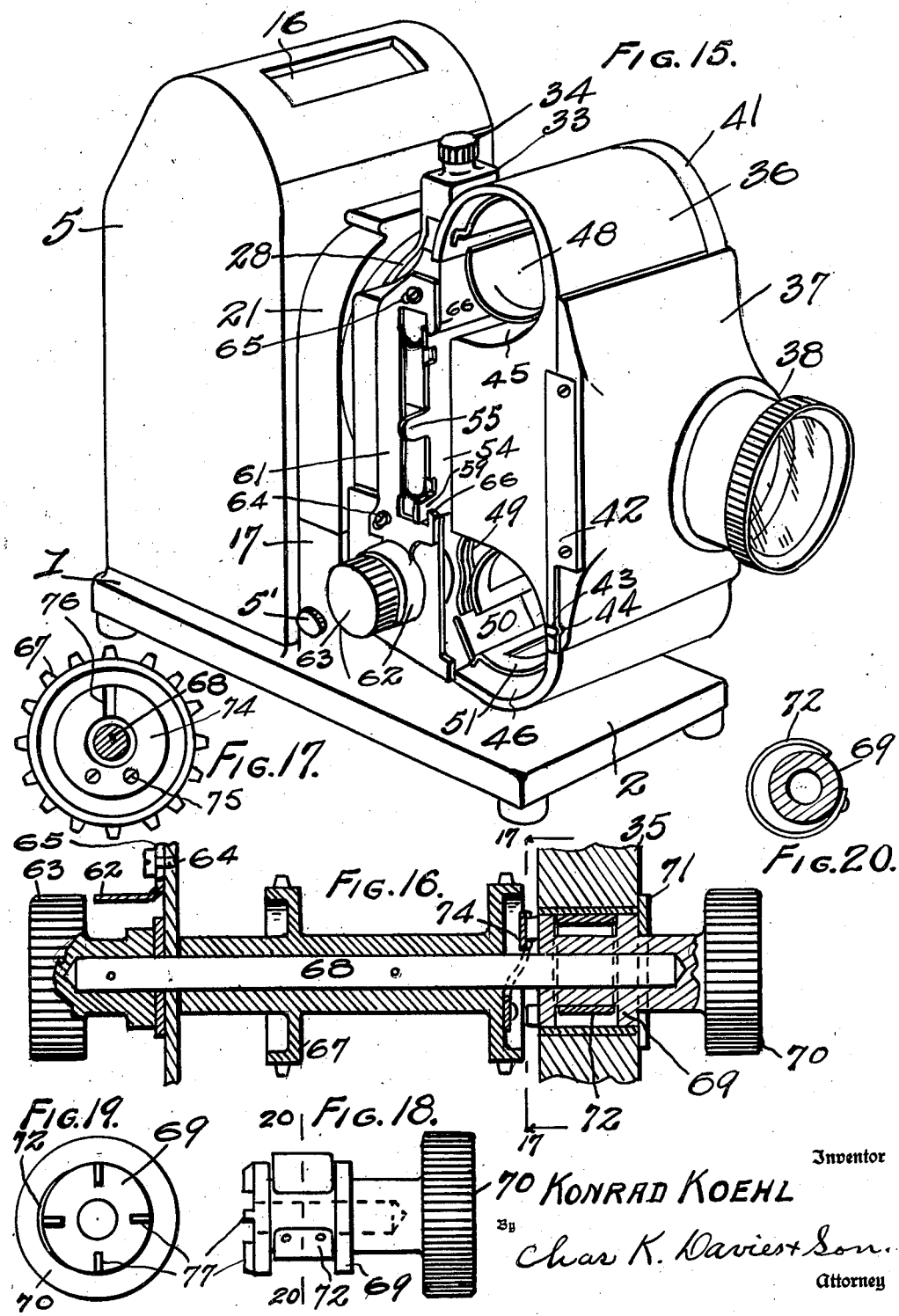

Patented Nov. 10, 1942

2,301,415

UNITED STATES PATENT OFFICE 2,301,415

PROJECTION APPARATUS

Konrad Koehl, Dresden, Germany; vested in the Alien Property Custodian

Application October 12, 1938, Serial No. 234,707

3 Claims. (Cl. 88—24)

The present invention relates to an improved projection apparatus or a portable projector, for projecting and displaying images of objects, real pictures or photographs, from a film-strip, or from a plate, upon a screen or upon other suitable surface, and preferably in enlarged and magnified form.

As herein illustrated I preferably employ a direct positive miniature photographic film having the usual series of perforations along its lateral edges; means are provided for intermittently feeding or advancing the film, picture by picture, for single image projections; and interconnected means are also provided for advancing or feeding the film-strip continuously for a continuous projection of the successive pictures.

In the use of projection apparatus of this character it is customary for the operator of the projector to work in the dark, thus rendering it a difficult matter to correctly insert the film-strip, or to change film-strips when necessary. To overcome this difficulty I provide means whereby demountable portions of the apparatus may with facility be separated and removed, and filmstrips exchanged; after which the removed or detached portion or portions of the projector, with the fresh film-strip may with equal facility be restored to operative position as a part of the apparatus.

The projector includes a rotatively adjustable and demountable front portion or head that contains the winding mechanism for the film-strip, a portion of the condenser system, and the objective lenses; and this demountable head is also attached to the body of the projector in such manner that it is rotatively adjustable angularly of the stationary portion or body of the projector, and also of the display screen, to bring the film strip into either vertical position or horizontal position.

It sometimes occurs that a single picture in a film-strip bearing a series of pictures has been taken upside down and consequently the single picture is out of position with relation to the remaining pictures on the strip. Under such conditions it is not necessary to remove the filmstrip from the projector, because the adjustable front or head of the projector, in which the film is mounted, may readily be turned through one hundred and eighty degrees for correct display of the single picture, after which the head of the projector may conveniently be returned for restoration to its original position. If necessary, of course, the demountable and rotatively adjustable head of the projector may be turned through a complete cycle of three hundred and sixty degrees.

Means are provided for a high degree of light output from the projector, and therefore it is especially adaptable for the projection of color film-strips and pictures, as well as for use with rectangular plates or glass slides.

The invention consists in certain novel combinations and arrangements of parts of the projector as will hereinafter be more fully set forth and claimed. In the accompanying drawings I have illustrated one complete example of the physical embodiment of my invention in which the parts are combined and arranged according to one mode thus far devised for the practical application of the principles of my invention, but it will be understood that changes and alterations are contemplated and may be made in the structures exemplified in the drawings, within the scope of my claims, without departing from the principles of my invention.

This present application is a continuation in part of my application for patent filed March 31, 1938, Ser. No. 199,296.

Figure 1 is a central vertical longitudinal sectional view of the projector in upright position.

Figure 2 illustrates in a conventional way a portion of the positive or direct photographic strip produced from a miniature camera and employed in the projector.

Figure 3 and Figure 4 are enlarged detail sectional views showing the snap fastener for retaining the rotary head or front portion of the projector in adjusted position.

Figure 5 is a vertical, transverse sectional view at line 5—5 of Figure 1.

Figure 6 is a view in elevation showing the separable condenser frame removed from the projector, which frame also supports the rotary adjustable, and demountable head or front of the projector.

Figure 7 is a face view and Figure 8 is a side view of the separable film-holder, removed from the projector.

Figure 9 is an enlarged front elevation of the projector with the adjustable head turned through an angle of ninety degrees from the position of Figure 1, and with the strip in horizontal position to move transversely of the projector.

Figure 10 is a front face view of the removable frame and rear presser plate or guide plate for the film-strip; Figure 11 is an edge view; and Figure 12 is a face view at the rear of the presser plate or guide for the film.

Figure 13 is a horizontal detail sectional view, showing one of the spring blades for frictionally retaining the rear presser plate and its frame in position in the projector.

Figure 14 is a perspective view of an auxiliary vignette plate with its aperture, that may be used in the projector for reforming and reducing the projection aperture.

Figure 15 is a perspective view of the portable projector embodying the invention, with the film in upright position.

Figure 16 is an enlarged longitudinal sectional view showing the rotary knobs and film winding mechanism for advancing or feeding the film strip with either an intermittent feed or with a continuous feed.

Figure 17 is a face view of the clutch disk on the film winding-reel that co-acts with the rotary knob of Figure 18.

Figure 18 and Figure 19 show respectively a side view and an end view of the operating knob forming part of a clutch which advances or feeds the film strip continuously.

Figure 20 is a detail edge view of the split resilient brake-band or friction ring which retains the rotary knob of Figure 18 against turning when the film strip is being intermittently advanced.

In Figure 2 a fragment of a well known type of miniature film strip is indicated as F and provided with conventional perforations F' arranged along the lateral edges of the strip, and this strip is employed in the projector for display of its pictures upon a screen. A standard type of glass or transparent slides may be substituted for the standard film-strip, if desired, and under the latter circumstances the film feeding or advancing mechanism hereinafter described is not employed.

The projector illustrated in the drawings is of the portable type, and its parts are compactly arranged in order to occupy a minimum of space, while at the same time the parts of the projector are readily separable and demountable in order to give access to the interior of the projector, and for assembling, cleaning and adjusting parts.

In the preferred form of the invention I employ a stationary body and a rotatively adjustable and demountable head connected therewith, and the projector, with its apertures alined along the optical axis also includes the axially alined mirror, lamp, a triple condenser, film-guide disposed transversely of the projector, and a photographic objective or series of lenses, by means of which the images on the film are projected and enlarged or magnified.

The stationary or body portion of the projector includes a substantial base 1 and its integral shelf 2, and this body portion is constructed and fashioned in suitable manner of appropriate material. The body may be supported on a table or other object, and a threaded nut 3 is illustrated in Figure 1 by means of which the projector may also be mounted on a threaded bolt or stud of a tripod or similar stand. The rear part of the base 1 is fashioned with an upper integral flange 4, upon which the exterior lamp casing 5 is detachable mounted and secured in suitable manner, as by the use of a snap fastener 5' indicated in Figs. 9 and 15. The lamp or projection bulb 6 is supported as usual in a socket within the base 1, with the electrical terminals 7 and 8 connected to a convenient source of electrical energy for lighting the lamp with a comparatively high degree of candle power.

An interior lamp housing 9 is also detachably mounted on base 1, and secured by the snap fastener 5', within the casing 5 and the inner housing is spaced from the exterior casing to form a heat insulating space or jacket surrounding the lamp. This exterior casing and the inner housing have front openings, and the opening of the housing is provided with a front glass window 10 disposed in the optical axis of the projector.

At the rear of the lamp and within the inner lamp housing is mounted a longitudinally adjustable concave reflecting mirror 11 having a bracket 12 that is mounted on the rear wall of the housing, and a screw 13 is illustrated as one means for adjusting the mirror and retaining it in proper relation to the lamp and in the optical axis of the projector.

In order to prevent excessive heating of the lamp casing and housing that might otherwise extend to the condensers, film and other interior parts of the projector along the optical axis; and also to permit the use of a lamp of comparatively high candlepower; I provide means for venting the interior of the lamp housing by the use of holes 14 in the base walls that permit circulation of cool air currents to the interior of the housing. The vent holes are arranged or located to permit access of fresh cool air currents to the otherwise heated parts, and at the same time to prevent egress of light rays from the lamp housing. A series of vent holes 15 are also shown in the upper part of the inner housing, and another series of holes 16 are shown in the top of the exterior lamp casing, for egress of warm air currents, in order that the housing and casing may be efficiently ventilated.

Between the base on which the lamp casing and lamp housing are supported, and the front shelf 2 of the body of the projector, I arrange an integral, upright, transversely extending hollow support or double flange 17 having a vent space 18, and within this double flange or hollow support is mounted the separable condenser unit shown in Figure 6. This condenser unit forms a part of the stationary portion of the projector, and it is also provided with vent openings 19 and 20 for circulation of air currents, as indicated in Figure 1. The condenser unit includes a rectangular frame 21 having two spaced legs or lugs 22 that fit neatly in the wall-space or socket 18 of the hollow support 17, and the unit is thereby frictionally retained in proper position. Two spherical condenser lenses 23 and 24 are mounted in the unit and spaced apart by a spring or resilient spreader 25, and these lenses form part of the triple condenser of the projector.

The separable condenser unit, when mounted in position, also forms the stationary support for the rotatively adjustable and demountable head of the projector, and for this purpose it is equipped with an inner flanged retaining ring 26 secured by screws 27 to the front face of the frame 21 and encircling its circular aperture. A rotatably adjustable, annular, flanged collar 28 is mounted between the flanged retaining ring 26 and the front face of the frame 21, and this collar forms the holder for the rotatively adjustable head of the projector. Any suitable snap fastener, or spring latch, may be used to retain the holder, with the projector head, in its adjusted position with relation to the retaining ring. For instance, in Figures 3 and 4 a light coil spring 29 is mounted in a socket 30 of the inner retaining ring and the holder has four (more or less) complementary, diametrically arranged sockets or curved grooves 31, any one of which is adapted to register with the socket 30 of the ring 26. The spring remains stationary with the retaining ring 26, but it will be apparent that by exerting a slight pressure of the hand to turn the holder, and head, the initial turning movement will crush the spring so that the socket or groove 31 may pass free of the spring, thus releasing the holder so that it may be turned, with the head, another notch. When the second notch is encountered by or engages the spring, the latter expands into the notch to hold the adjustably rotatable head in adjusted position. However, the head may yet be turned as the turning pressure is increased to crush down the spring and release the second notch, and of course the rotatably adjustable head may be turned either clockwise or anti-clockwise in this adjustment.

The flanged collar 28 also forms a part of a quick-acting joint between the stationary body of the projector and the demountable head of the projector, and for this purpose the collar has an open socket formed by a tangentially spaced front flange 32, a diametrically arranged radially projecting hollow head 33, and a radially arranged set screw 34 threaded in the hollow head, as best seen in Figures 1 and 6.

The rotatively adjustable and demountable head comprises two separable sections that may readily be separated for assembling, cleaning, and adjusting of parts, and these two sections are indicated as 35 for the combined gear casing and condenser housing; 36 for the separable film housing (Figs. 7 and 8); and another section 37 of the gear casing 36 which forms the housing or mount of the photographic objective lenses 38 mounted at the front of the section 37.

In Figure 1 the quick-acting means mounted on the demountable head for joint use with the flange 32, and head 33 and screw 34 of the body or stationary part of the projector, comprises an attaching plate 39 attached to the rear face of the section 35. As indicated in dotted lines, Fig. 5, this plate extends transversely of the section, and its upper edge is curved to conform to the circular projecting aperture that occurs in the optical axis of the projector. The straight bottom edge of this plate fits into the socket formed between the flange 32 and the face of the frame in Fig. 6, it being understood that this "socket" is open at the top and both ends and closed at the bottom. As best seen in Figure 1 a head 40 is fashioned on section 35 diametrically opposite to the attaching plate 39 and the body is undercut to form a neck below the head, in order that the head 40 may be readily inserted within and also be withdrawn from the hollow head 33 of the frame or unit 21.

As seen in Figure 1 the rear face of the section 35 is slightly grooved or recessed to receive and accommodate the flange 32 when the joint is locked, and the free edge of the attaching plate 39 projects across or in front of this recess to fit into the socket formed by the flange 32. The head 40 diametrically opposite the attaching plate 39 fits up into its socket or the interior of the hollow head 33 of the holder, and the cutaway neck at the base of the head provides for the insertion and withdrawal of the removable head from the stationary head. Referring to the locked joint in Figure 1, when screw 34 is backed out and thus withdrawn from head 40, the projector head may be lifted to move head 40 farther up into the hollow head 33 a distance sufficient to lift the attaching plate 39 free of the flange 32, and then the lower part of the projector head is swung away from the body of the projector, i. e. to the front, and simultaneously the head 40 is withdrawn from head 33, thus freeing the projector head from the body of the projector. By reversing this operation, the head may be applied to the stationary part of the projector, and then by turning home the screw 34 the head is locked to the body.

The integral portion of the demountable head is fashioned with a single side wall 41 that unites or joins the spaced sections 35 and 37 of the head, and between these two sections an open space is provided which forms a pocket, open at two ends and one side, for the reception of the separable film housing or section 36. The film housing, shown best in Figures 7 and 8, conforms to the shape of this pocket, and it is adapted to be slid into and out of the pocket. For retaining the film housing in its pocket a spring latch or spring blade 42 at its fixed end is attached as by screws to the section 37 of the head, and the free end of this blade is fashioned with a detent 43. The film housing has in its outer face a notch or groove 44 that slips under the detent, and this detent and notch arrangement form a spring catch that holds the detachable film-housing in its proper position.

The section 36 forming the apertured filmhousing is provided with spaced compartments 45 and 46, at opposite sides of the aperture 47, which is in the optical axis of the projector, as best seen in Figure 8, and it will be understood that the roll or film-strip F is deposited in a roll in compartment 45, and fed or unwound from its coiled condition or roll, by means of a pull across the projection aperture, to the compartment 46, where the film is again re-wound into another roll or coil. For convenience of illustration I shall refer to the feed or advance movement of the film from a coil in compartment 45, across the projection aperture or optical axis of the projector, by means of a pull imparted by the winding or feeding mechanism. The film roll is loosely deposited within the compartment 45, but to retain the shape of the coil or roll and to assist in guiding the film as it is fed from the compartment, a curved spring guide 48 is mounted within the compartment. After the film crosses the optical axis of the projector it is assisted to compartment 46 by means of two resilient slotted legs 49 attached to the rear face of the removable film housing, and these legs, as seen in Figures 7 and 8 project across the rear opening of the compartment 46.

These guide legs 49 co-act with a guide tongue 50 attached at the rear mouth or opening of the receiving compartment 46 to guide the leading end of the film, and the remaining portion of the strip, into the compartment 46, and within the compartment another curled guide 51 receives the strip and causes it to be coiled or re-wound into a roll so that the rewound roll, after projection, may be withdrawn from the compartment 46. As seen in Figures 7, 8, and 15 the feed compartment 45, the receiving compartment 46, and the aperture 47 are open at one side of the film housing, and when the latter is removed from the head, the film roll may readily be deposited in compartment 45, and with equal facility, after projection, the re-wound film strip may be taken from the compartment 46.

In the projection aperture of the head, along the optical axis of the projector are mounted two transversely extending guide plates 52 and 53, of glass or other transparent material, between which the film strip is passed or guided from compartment 45 to compartment 46, by action of the winding mechanism or film feeding mechanism. The front guide plate 52 is permanently mounted on the film housing 36 at its rear side and extends across and closes the aperture 47 of the housing, and this guide plate is, of course, removable with the separable film-housing.

The rear guide plate 53 is a resiliently supported, removable presser plate of glass, which as best seen in Figures 10, 11, 12, 13, is mounted on the apertured frame or plate-holder 54 by means of retaining lugs conveniently struck up from the metal of the frame. The guide plate is rigidly mounted in its frame to form a removable slide, and the frame has a handle-lug 55 to facilitate sliding the frame and its plate into and out of the optical axis of the projector. The slide frame has rounded edges and the frame, with the presser plate, is urged toward the stationary plate 52 by means of spaced, parallel spring blades or leaves 56, 56, located in recesses in the front face of the section 35 and spaced above and below the projection aperture of this head section and the optical axis of the projector. One end of each of these springs is attached as by a screw to the housing, and the springs are bent or flexed to project transversely of the head in the recess, opposite to guide lips 57 for the slide, and as before stated, the springs urge the presser plate toward the film strip as it passes from one compartment to the other.

As best seen in Figure 11, stop lugs 58 are provided on the slide frame to engage against the wall of a portion of the section 35, as in Fig. 13, to limit the movement of the slide as a whole.

The slide frame is also provided with two pairs of bent lugs 59, Figs. 10, 11, by means of which the auxiliary vignette plate 60 of Fig. 14 may be mounted on the slide frame for use when the aperture is to be reformed or reduced as required.

In connection with the resilient presser guide plate 53 and its slide frame 54 I employ a retaining plate that is slidable to release the pressure on the film-strip when required. This slide plate is mounted on the exterior of the section 35 of the head, and it is adapted to engage the slide frame and thus pull the presser plate away from the film strip thereby releasing the strip from close contact with the two guide plates. This release of the film is desirable to prevent marring of the film, especially while the film is being advanced or fed continuously between the guide plates. For this purpose the exterior slide plate 61 is provided with a thumb piece or finger-flange 62 in close proximity to the operating knob 63 by means of which the film strip is advanced with an intermittent movement. The exterior slide plate is retained on the head by means of screws 64 in co-action with obliquely extending slots 65, and the plate is fashioned with hooks 66 that engage over the opposite edges of the removable slide or resiliently supported presser plate. Thus in Figure 15 it will be seen that the thumb may press on the curled flange 62 to retract the resiliently supported slide and presser plate against the tension of the spring blades 56, and thus free the film-strip from its guide plates.

The knob 63 forms one of the rotary knobs, of which there are two, for winding, either forward or backward, the film strip from one compartment to another, between the two guide plates, and as best seen in Figure 16 this winding mechanism includes a rotary, toothed drum or reel 67 located in a chamber or recess of the housing section 35, and this toothed drum co-acts with the pair of slotted guide legs or tongues 49 (Fig. 7) that depend from the film housing, to pass the film strip into the receiving compartment 46.

The drum is fixed on a shaft 68 journaled in the opposite walls of the recess in section 35, and the manually turned knob 63 is also fixed on the shaft, but exterior of the head, so that by turning the knob 63 an intermittent motion may be imparted to the film strip for a succession of projected pictures.

The knob 63 is fixed on one end of the shaft, and the opposite end of the shaft is journaled to turn freely in a flanged hub 69 which also is journaled in a wall of the recess of section 35, and a second operating knob 70 is formed integrally with this hub and located exterior of the projector head. The winding mechanism is retained against longitudinal displacement by means of an exterior retaining plate 71 which overlaps the outer face of the hub and is attached to the section 35. This knob 70 is employed to impart a continuous rotation to the drum for a continuous feed or movement of the film strip, and it will be understood that the knob 70 remains idle while knob 63 is being turned for intermittent projection of pictures. Knob 63, however, turns with the turning of knob 70.

As best seen in Figs. 18 and 20, the flanged hub 69 is equipped with a split resilient brake band or ring 72 having one end affixed thereto, and this resilient brake band frictionally engages a fixed bearing ring 73 in the wall of the housing 35. The split brake ring 72, due to its attachment with the hub and its frictional engagement with the fixed bearing ring 73, holds the hub 70 against turning when the knob 63 and the shaft 68 are turned.

For imparting the continuous movement to the film-strip by turning the knob 70 I employ a clutch arrangement between the hub 69 and the drum 67, which includes a resilient clutch ring 74 having its central opening mounted over the shaft 68, and located between the end of the hub and the adjoining end of the drum. As best seen in Fig. 17 a portion of this clutch ring is fixed by screws 75 to the drum, and the ring has a radially extending dent or clutch-groove 76 adjacent the end or face of the hub. The adjoining face of the hub has a number of complementary radially extending clutch teeth 77, any one of which is designed to fit into the groove 76 of the ring. As the knob 70 is turned by hand, the tension of the split ring or brake ring 72 is overcome, and the closed clutch or engaged clutch-tooth and clutch-groove cause turning movement of the drum.

For the intermittent or picture by picture feed of the film strip, the drum 67 is provided with spur teeth to the number required for advancing the film strip one picture with each two turns of the knob 63, and the clutch ring is rotated with each rotation of the knob. In the initial adjustment of the film strip the knob 70 is employed to center the first picture in the projection aperture, and thereafter the intermittent feed is accomplished by turning the knob 63.

As before stated a triple condenser forms part of the projection system, and in addition to the rear lens 23 and intermediate lens 23 located within the separable condenser frame 21, a third lens 78 is mounted in the projection aperture along the optical axis of the projector. The lens 78 is mounted in the section 35 of the head in front of the intermediate lens and to the rear of the presser plate 53, and an annular spring device similar to the spring 25 is employed to hold the lens in place. These springs are retained in place in suitable manner, as by a plate 25' shown in dotted lines in Figure 5 as attached by a screw in the rear face of the head-section 35.

The condenser lenses and the screen 10 are interposed between the lamp 6 and the film guides or plates 52—53 along the optical axis of the projector, and the heat absorbing filter 10 aids in preventing access of heated air currents from the lamp housing to the film, and as indicated at 14, 18, 19, 20, Figure 1, the vent openings provide for circulation of air currents to carry off the heat from the lamp.

By the use of the rotatively adjustable and demountable head as a whole, the separable film housing, the separable presser plate or guide, and the separable condenser unit of Figure 6 which forms the supporting holder for the head, as well as the detachable lamp casing and lamp housing, the apparatus may with facility be dismantled for various purposes, and with equal facility the parts may be assembled. The separable film housing may readily be removed for "loading" and for withdrawing the film strips, and the removable presser plate may be manipulated with facility for the performance of its functions.

The arrangement of the operating knobs 63 and 70 at opposite sides of the head permit the use of both hands in manipulating the film-strip, thus facilitating the operation of the projector.

Having thus fully described my invention, what I claim as new and desire to secure by Letters Patent is:

1. In a projector and its housing, the combination with means for guiding a film strip across the exposure-projection aperture, of a shaft journaled adjacent one of its ends in the housing, a film engaging drum rigid with the shaft, a knob rigid with the shaft and exterior of the housing, a hub journaled in said housing and having a central passage therein forming a journal for the other end of the shaft, and a knob on the hub, a series of spaced detents on the hub, a co-acting resilient clutch ring on said drum having means for engaging one of said detents, means for yieldingly retaining said hub against rotation when said first knob is rotated whereby said ring and detent will yieldingly limit the rotation of the first knob, and means permitting rotation of said hub by said second knob when a force sufficient to overcome the yielding hub retaining means is applied to said second knob.

2. In a projector and its housing the combination with means for guiding a film strip across the exposure-projection aperture, of a shaft journaled adjacent one of its ends in the housing, a film engaging drum rigid with the shaft, a knob rigid with the shaft and exterior of the housing, a hub journaled in said housing and having means therein forming a journal for the other end of the shaft, and a knob on the hub, a series of spaced detents on the hub, a co-acting resilient clutch ring on the drum having means for engaging one of said detents, said hub being flanged to form a peripheral groove, a split resilient ring having one end attached to the grooved hub between the flanges, the free end of said ring adapted to bear against the housing to yieldingly retain the hub against rotation when the first knob is rotated.

3. In a projector, the combination with a head having an exposure-projection aperture, and said head having a single forwardly projecting side wall forming a pocket open at two ends and one side, of a separable film housing mounted in said pocket and retaining means for the housing, said housing also having a central enclosed exposure-projection aperture alined with the first aperture in the optical axis of the projector, said housing having at opposite sides of its aperture transversely extending open-end film-compartments, film-guiding means in said two compartments, and film winding mechanism mounted in said head for advancing a film from one compartment to another compartment transversely of the optical axis of the projector and between said apertures.

KONRAD KOEHL.